(12) United States Patent
Ling et al.

(10) Patent No.: US 12,335,196 B2
(45) Date of Patent: *Jun. 17, 2025

(54) DATA BLOCK TRANSMISSIONS

(71) Applicant: LENOVO (BEIJING) LIMITED, Beijing (CN)

(72) Inventors: Wei Ling, Beijing (CN); Chenxi Zhu, Beijing (CN); Bingchao Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,532

(22) Filed: Feb. 23, 2024

(65) Prior Publication Data
US 2024/0195581 A1 Jun. 13, 2024

Related U.S. Application Data

(63) Continuation of application No. 17/278,936, filed as application No. PCT/CN2018/114607 on Nov. 8, 2018, now Pat. No. 11,962,536.

(51) Int. Cl.
*H04L 5/00* (2006.01)
*H04L 1/18* (2023.01)
(Continued)

(52) U.S. Cl.
CPC ............. *H04L 5/0053* (2013.01); *H04L 1/18* (2013.01); *H04L 5/0048* (2013.01); *H04W 72/23* (2023.01); *H04L 2025/03522* (2013.01)

(58) Field of Classification Search
CPC ......... H04L 5/003; H04L 5/0053; H04L 1/16; H04L 1/18; H04L 5/0048; H04L 5/0051;
(Continued)

(56) References Cited

U.S. PATENT DOCUMENTS 9,137,083 B1  9/2015 Lu et al.
9,819,445 B1 * 11/2017 Patel .................... H04L 1/0071
(Continued)

FOREIGN PATENT DOCUMENTS

EP      3860284 A1   8/2021
WO   2017105545 A1   6/2017
WO   2017196406 A1  11/2017

OTHER PUBLICATIONS

Huawei Hisilicon, Enhancements on multi-TRP/panel transmission, 3GPP TSG RAN WG1 Meeting #94bis, R1-1810104, Oct. 8-12, 2018, pp. 1-17.
(Continued)

*Primary Examiner* — Warner Wong
(74) *Attorney, Agent, or Firm* — Kunzler Bean & Adamson

(57) ABSTRACT

Apparatuses, methods, and systems are disclosed for data block transmissions. One method includes transmitting a data blocks frequency multiplexed in a time duration to a device, wherein: the data blocks are transmitted based on spatial information and a redundancy version sequence; each data block of the data blocks carries the same data varied based on a redundancy version indicated by the redundancy version sequence and occupies a same number of virtual resource blocks in a frequency domain; the data blocks are scheduled by a control channel, wherein the control channel is used to transmit information that indicates the redundancy version sequence of redundancy version sequences configured by high layer signaling; the spatial information is indicated in the control channel or is configured by high layer signaling; and a total number of data blocks of the data blocks is configured by high layer signaling.

18 Claims, 11 Drawing Sheets

(51) Int. Cl.
*H04W 72/23* (2023.01)
*H04L 25/03* (2006.01)

(58) Field of Classification Search
CPC . H04L 1/02; H04L 1/1819; H04L 5/00; H04L 5/0005; H04L 5/26; H04L 27/2672; H04L 2025/03522; H04W 72/12; H04W 72/1273; H04W 72/1289
See application file for complete search history.

(56) References Cited

U.S. PATENT DOCUMENTS

| | | | |
|---|---|---|---|
| 10,541,788 B2* | 1/2020 | You | H04L 1/1812 |
| 2006/0114936 A1* | 6/2006 | Paffen | H04W 28/14 370/469 |
| 2009/0276675 A1 | 11/2009 | Ojala et al. | |
| 2011/0141952 A1 | 6/2011 | Wang et al. | |
| 2014/0362701 A1 | 12/2014 | Roh et al. | |
| 2015/0229444 A1 | 8/2015 | Webb et al. | |
| 2015/0282130 A1 | 10/2015 | Webb et al. | |
| 2015/0341960 A1 | 11/2015 | Quan et al. | |
| 2018/0375616 A1 | 12/2018 | Beale et al. | |
| 2018/0375636 A1 | 12/2018 | You et al. | |
| 2019/0037545 A1 | 1/2019 | Jiao et al. | |
| 2019/0081745 A1* | 3/2019 | Qin | H04L 1/0003 |
| 2019/0097767 A1* | 3/2019 | Qin | H04L 1/0014 |
| 2019/0150164 A1 | 5/2019 | Nam et al. | |
| 2019/0200214 A1 | 6/2019 | Liu et al. | |
| 2020/0336248 A1 | 10/2020 | Bae et al. | |
| 2021/0315002 A1 | 10/2021 | Nakamura et al. | |

OTHER PUBLICATIONS

ZTE, Enhancements on multi-TRP/Panel transmission, 3GPP TSG RAN WG1 Meeting #95, R1-1812256, Nov. 12-16, 2018, pp. 1-14.
Catt, "Considerations on multi-TRP/panel transmission for Rel-16", 3GPP TSG RAN WG1 Meeting #94bis R1-1810555, Oct. 8-12, 2018, pp. 1-10.
NTT Docomo, Inc., "Enhancements on multi-TRP/panel transmission", 3GPP TSG RAN WG1 Meeting #94bis R1-1811348, Oct. 8-12, 2018, pp. 1-21.
Samsung, "WI Proposal on NR MIMO Enhancements", 3GPP TSG RAN Meeting #80 RP-181453, Jun. 11-14, 2018, pp. 1-5.
3GPP, "3rd Generation Partnership Project; Technical Specification Group Radio Access Network; NR; Physical layer procedures for data (Release 15)", 3GPP TS 38.214 V15.2.0, Jun. 2018, pp. 1-94.
3Gpp, "3rd Generation Partnership Project; Technical Specification Group Radio Access Network; NR; Radio Resource Control (RRC) protocol specification (Release 15)", 3GPP TS 38.331 V15.3.0, Sep. 2018, pp. 1-445.

* cited by examiner

DATA BLOCK TRANSMISSIONS

FIELD

The subject matter disclosed herein relates generally to wireless communications and more particularly relates to data block transmissions.

BACKGROUND

The following abbreviations are herewith defined, at least some of which are referred to within the following description: Third Generation Partnership Project ("3GPP"), 5G QOS Indicator ("5QI"), Acknowledge Mode ("AM"), Backhaul ("BH"), Broadcast Multicast ("BM"), Buffer Occupancy ("BO"), Base Station ("BS"), Buffer Status Report ("BSR"), Bandwidth Part ("BWP"), Component Carrier ("CC"), Coordinated Multipoint ("COMP"), Categories of Requirements ("CoR"), Control Plane ("CP"), CSI-RS Resource Indicator ("CRI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiplexing ("FDM"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Group ("LCG"), Logical Channel ID ("LCID"), Logical Channel Prioritization ("LCP"), Long Term Evolution ("LTE"), Levels of Automation ("LoA"), Modulation Coding Scheme ("MCS"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSc Per Packet Reliability ("PPPR"), Packet Switched ("PS"), Physical Sidelink Control Channel ("PSCCH"), Physical Sidelink Shared Channel ("PSSCH"), Quasi Co-Located ("QCL"), Quality of Service ("QoS"), Radio Access Network ("RAN"), Radio Access Technology ("RAT"), Resource Element ("RE"), Rank Indicator ("RI"), Resource Indication Value ("RIV"), Radio Link Failure ("RLF"), Resource Pool ("RP"), Radio Resource Control ("RRC"), Reference Signal ("RS"), Reference Signal Received Power ("RSRP"), Reference Signal Received Quality ("RSRQ"), Receive ("RX"), Redundancy Version ("RV"), Secondary Cell ("SCell"), Sub Carrier Spacing ("SCS"), Service Data Unit ("SDU"), Subscriber Identity Module ("SIM"), Signal-to-Interference and Noise Ratio ("SINR"), Sidelink ("SL"), Sequence Number ("SN"), Scheduling Request ("SR"), SRS Resource Set Indicator ("SRI"), Sounding Reference Signal ("SRS"), Synchronization Signal ("SS"), SS/PBCH Block or Synchronization Signal Block ("SSB"), Transmission Block ("TB"), Transmission Configuration Indicator ("TCI"), Time Division Duplex ("TDD"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Vehicle to Everything ("V2X"), Virtual Resource Block ("VRB"), Voice Over IP ("VOIP"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, data blocks may be transmitted. In such networks, the data blocks may be transmitted from multiple TRPs.

BRIEF SUMMARY

Methods for data block transmissions are disclosed. Apparatuses and systems also perform the functions of the apparatus. In one embodiment, the method includes transmitting a plurality of data blocks frequency multiplexed in a time duration to a device, wherein: the plurality of data blocks is transmitted based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

An apparatus for data block transmissions, in one embodiment, includes a transmitter that transmits a plurality of data blocks frequency multiplexed in a time duration to a device, wherein: the plurality of data blocks is transmitted based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

A method for data block transmissions includes receiving a plurality of data blocks frequency multiplexed in a time duration, wherein: the plurality of data blocks is received based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

An apparatus for data block transmissions, in one embodiment, includes a receiver that receives a plurality of data blocks frequency multiplexed in a time duration, wherein: the plurality of data blocks is received based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
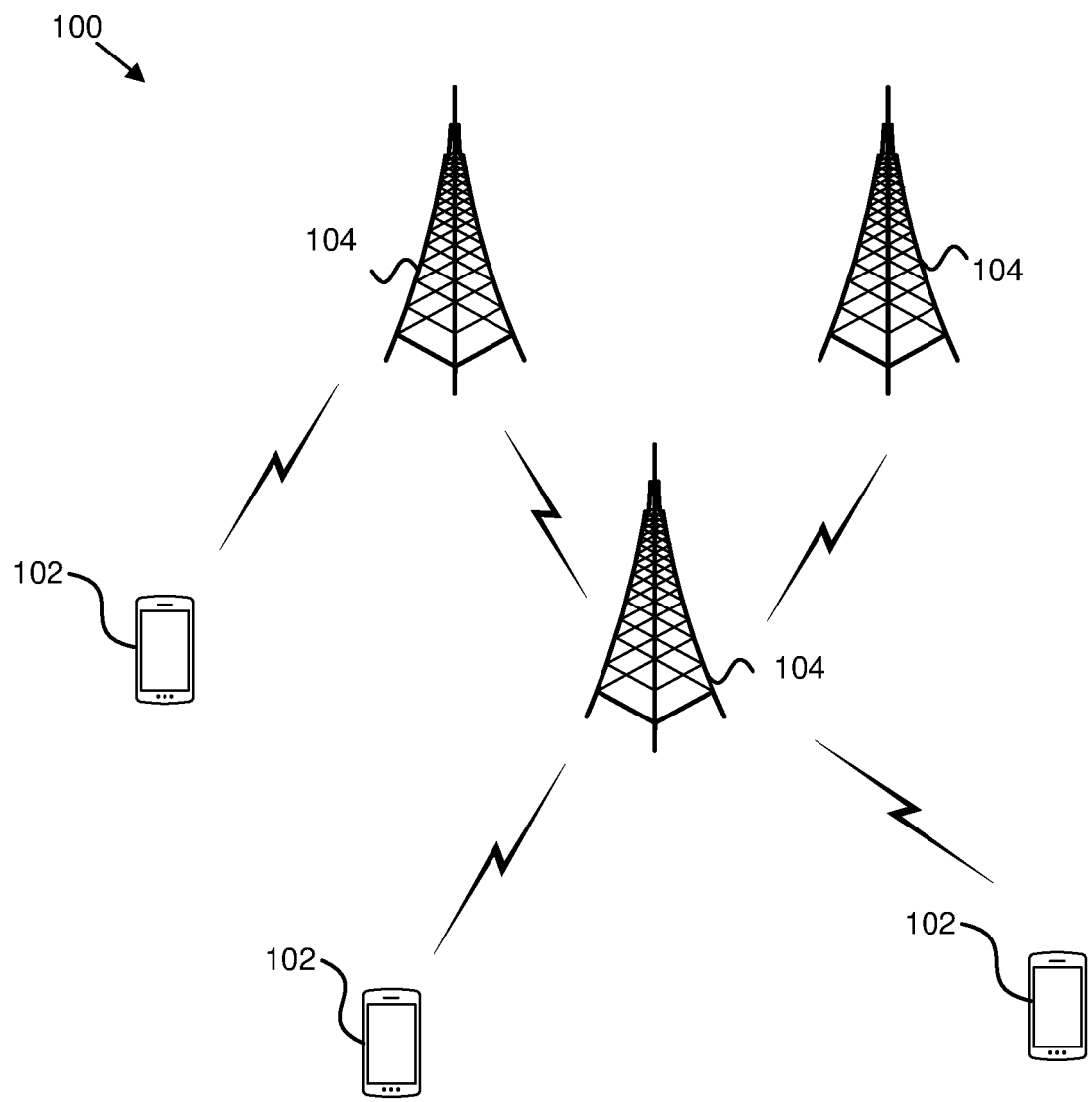
FIG. 1 is a schematic block diagram illustrating one embodiment of a wireless communication system for data block transmissions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for data block transmissions. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In some embodiments, a network unit 104 may transmit a plurality of data blocks frequency multiplexed in a time duration to a device, wherein: the plurality of data blocks is transmitted based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling. Accordingly, a network unit 104 may be used for data block transmissions.

In certain embodiments, a remote unit 102 may receive a plurality of data blocks frequency multiplexed in a time duration, wherein: the plurality of data blocks is received based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling. Accordingly, a remote unit 102 may be used for data block transmissions.

Figure 2:
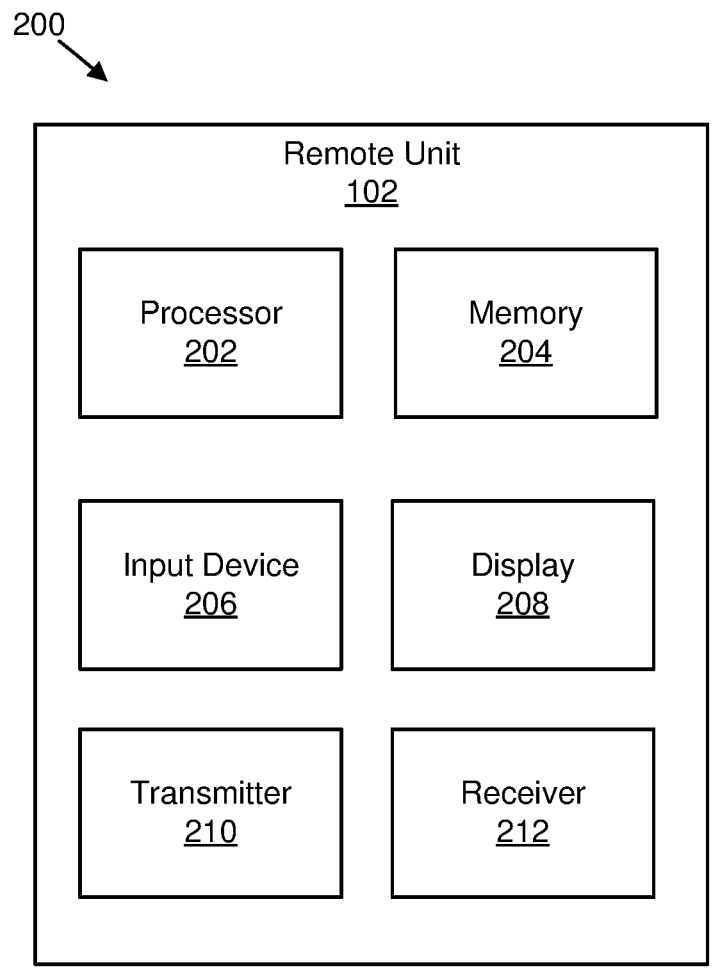
FIG. 2 is a schematic block diagram illustrating one embodiment of an apparatus that may be used for data block transmissions.

FIG. 2 depicts one embodiment of an apparatus 200 that may be used for data block transmissions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 receives a plurality of data blocks frequency multiplexed in a time duration, wherein: the plurality of data blocks is received based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
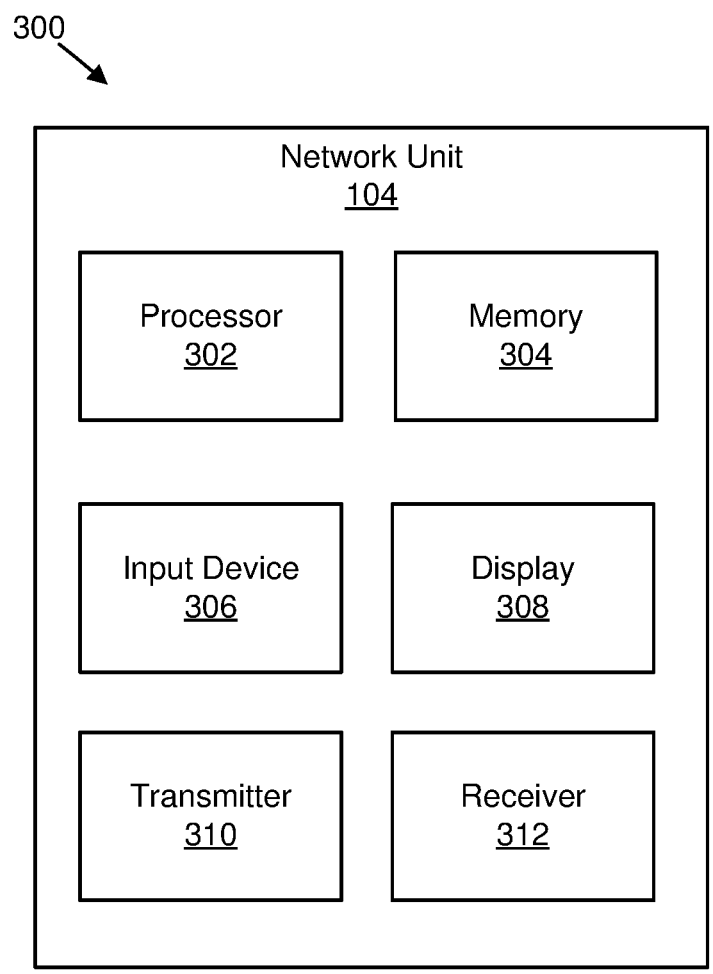
FIG. 3 is a schematic block diagram illustrating one embodiment of an apparatus that may be used for data block transmissions.

FIG. 3 depicts one embodiment of an apparatus 300 that may be used for data block transmissions. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 transmits a plurality of data blocks frequency multiplexed in a time duration to a device, wherein: the plurality of data blocks is transmitted based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, a gNB (e.g., network unit 104) may have multiple TRPs or panels. In such embodiments, analog beams associated with different TRPs or panels may be used to transmit data packets simultaneously and beams belonging to the same TRP or panel can't be used to transmit data packets simultaneously. Therefore, multiple beams from multiple TRPs or panels may be used to transmit the same data packet with different redundancy versions simultaneously to a UE to increase the robustness of a DL transmission while, at the same time, not increasing latency when compared to a single transmission. It should be noted that a panel may have multiple antennas controlled by one controller to perform analog beamforming. Moreover, different panels may be controlled by different controllers with each controller controlling all of the antennas in a respective panel. Furthermore, a TRP may have one or more panels. In some embodiments, a TRP may be part of a base station.

In one embodiment, multiple TRPs and/or panels of a single gNB may have an ideal backhaul or low latency backhaul. In such an embodiment, one PDCCH may be used to schedule transmission of the same TB with different redundancy versions and transmitted from multiple TRPs and/or panels with multiple TX beams to a UE (e.g., remote unit 102) in one time duration (e.g., a basic time unit, a symbol, a slot, a subframe, a half-frame, and/or a frame) using FDM. Furthermore, in such embodiments, the UE may be able to receive multiple TX beams simultaneously using a single panel. In certain embodiments, the UE may receive multiple TX beams simultaneously using multiple panels. In various embodiments, a number of RX beams may be equal to a number of UE panels. It should be noted that at most one RX beam may be used per UE panel and that RX beam may be used to receive multiple TX beams. In some embodiments, information indicating which beams can be received simultaneously by a UE may be obtained by a group based beam reporting via beam management.

Figure 4:
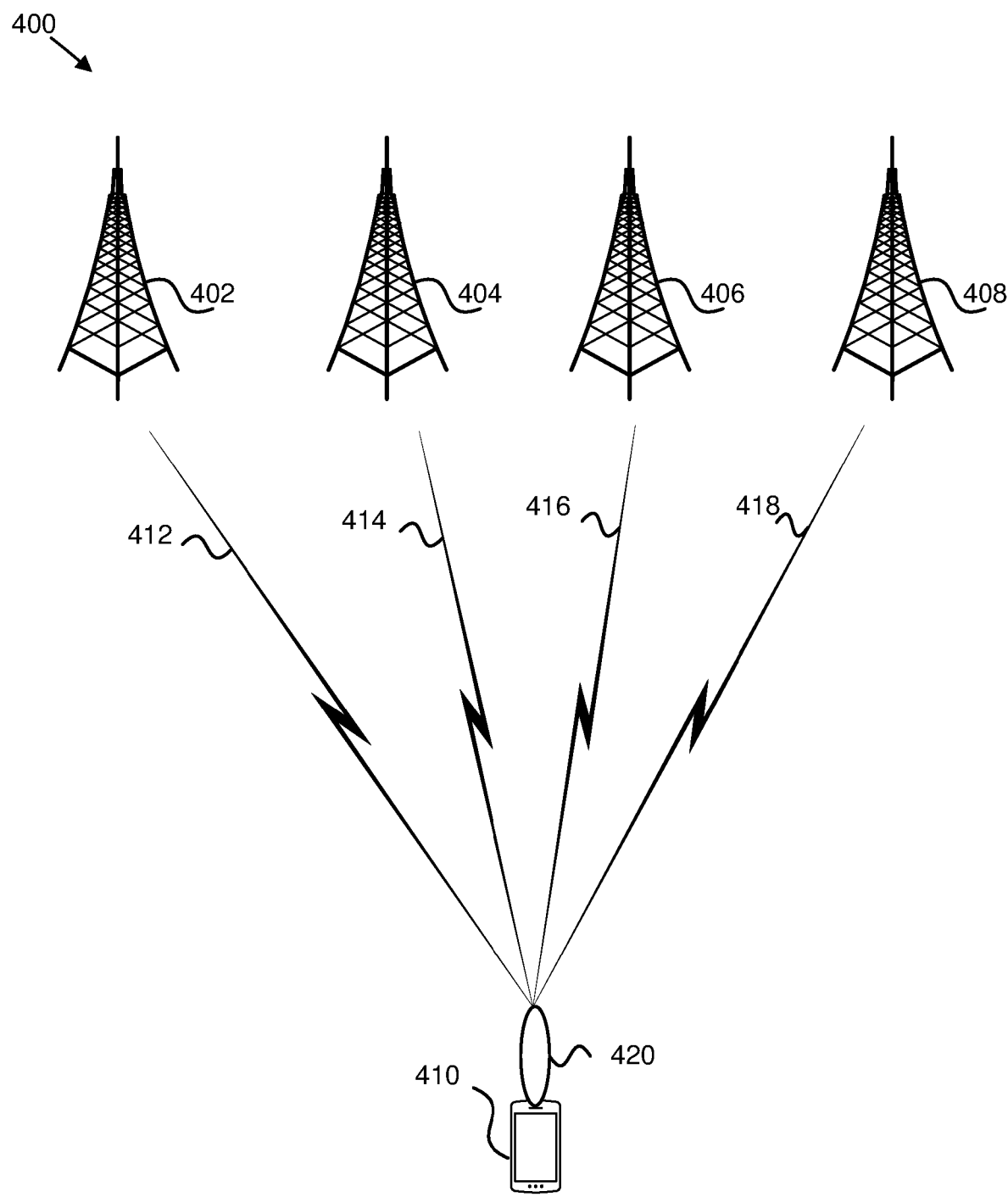
FIG. 4 is a schematic block diagram illustrating one embodiment of a system in which a single RX beam receives transmissions from multiple TX beams.
Figure 5:
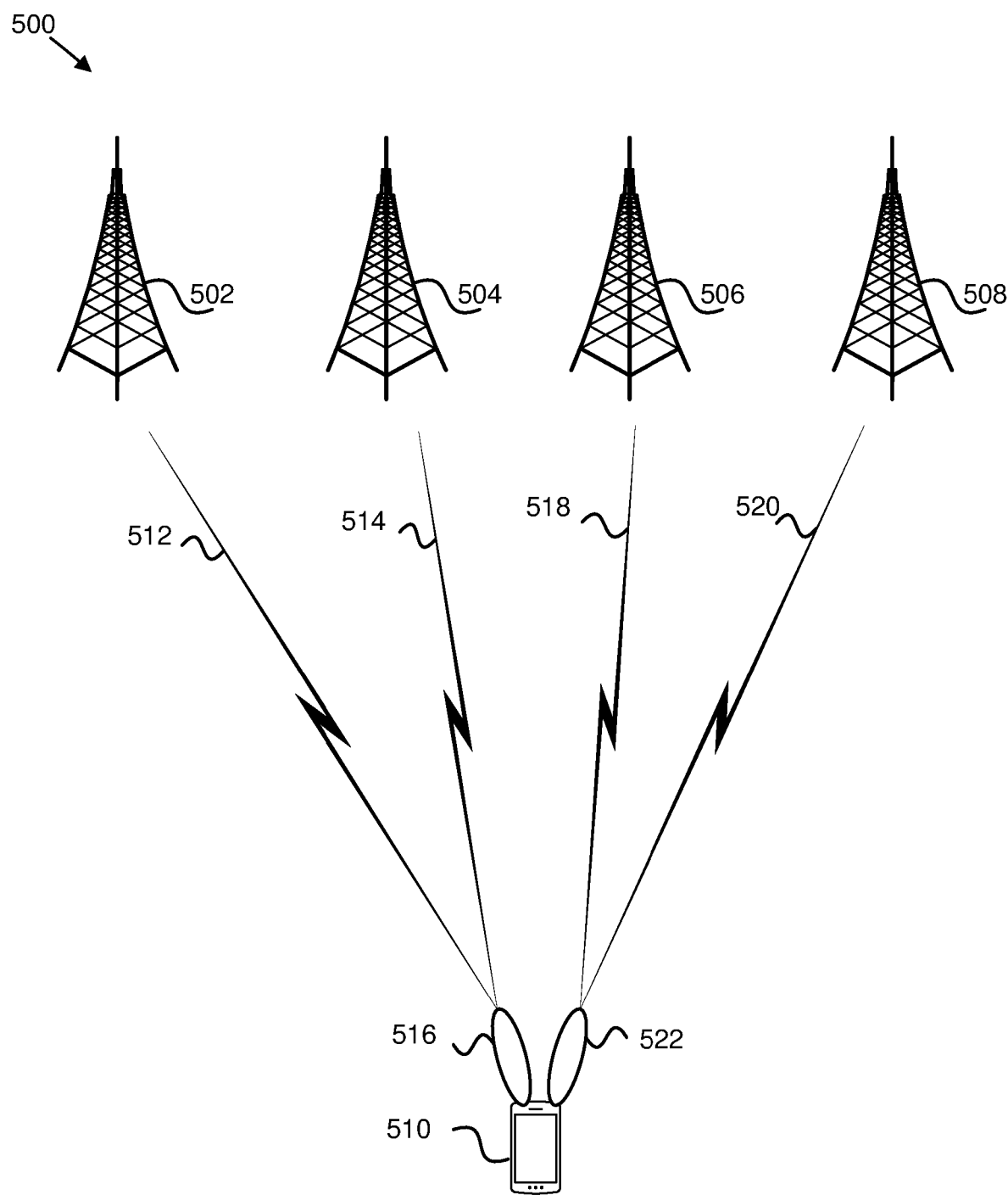
FIG. 5 is a schematic block diagram illustrating one embodiment of a system in which multiple RX beams receives transmissions from multiple TX beams.

As described herein, FIG. 4 illustrates a single RX beam with a UE having a single panel used to receive multiple TX beams from multiple TRPs, and FIG. 5 illustrates a UE having two RX beams with one RX beam per panel used to receive multiple TX beams from multiple TRPs.

Specifically, FIG. 4 is a schematic block diagram illustrating one embodiment of a system 400 in which a single RX beam receives transmissions from multiple TX beams. The system 400 includes a first TRP 402, a second TRP 404, a third TRP 406, a fourth TRP 408, and a UE 410. The first TRP 402 transmits a first TX beam 412, the second TRP 404 transmits a second TX beam 414, the third TRP 406 transmits a third TX beam 416, and the fourth TRP 408 transmits a fourth TX beam 418. A panel 420 of the UE 410 receives the first TX beam 412, the second TX beam 414, the third TX beam 416, and the fourth TX beam 418 using one RX beam.

FIG. 5 is a schematic block diagram illustrating one embodiment of a system 500 in which multiple RX beams receives transmissions from multiple TX beams. The system 500 includes a first TRP 502, a second TRP 504, a third TRP 506, a fourth TRP 508, and a UE 510. The first TRP 502 transmits a first TX beam 512 and the second TRP 504 transmits a second TX beam 514. A first panel 516 of the UE 510 receives the first TX beam 512 and the second TX beam 514 using a first RX beam. The third TRP 506 transmits a third TX beam 518 and the fourth TRP 508 transmits a fourth TX beam 520. A second panel 522 of the UE 510 receives the third TX beam 518 and the fourth TX beam 520 using a second RX beam.

In one embodiment, each TB of multiple TBs occupies the same time domain allocation and has the same number of RBs in the frequency domain scheduled by a single DCI that is transmitted in a PDCCH. As may be appreciated, all of the TBs of the multiple TBs may contain the same data that is varied using a redundancy version. In some embodiments, a single field of frequency domain resource assignment in DCI may be used to indicate the frequency allocation of each TB of the multiple TBs.

In some embodiments, there may be two types of DL frequency allocation to indicate a frequency allocation of a single TB. In various embodiments, the two types of DL frequency allocation may be described in TS 38.214 5.1.2.2.1 and 5.1.2.2.2. Both of the two types of frequency allocation may indicate VRB allocation for DL transmission while there is a one to one mapping between VRB and PRB. As described herein, frequency resource allocation may be indicated as allocating VRBs. This may be the equivalent to allocation of physical RBs because one VRB may be mapped to one physical RB.

In one embodiment, a bitmap indication scheme may be used in which a total number of '1' bits, represented by N in a bitmap, may indicate a multiple of a number of times a TB (e.g., having a corresponding number of VRBs) is repeated ("Nrep"), with each TB occupying N/Nrep continuous RBGs indicated by the bitmap by an increasing order of the RBG index. As may be appreciated, the continuous occupied RBGs (e.g., indicated with a '1' bit) may not be in adjacent frequencies because there may be one or more unoccupied RBGs (e.g., indicated with a '0' bit) between the continuous occupied RBGs.

Figure 6:
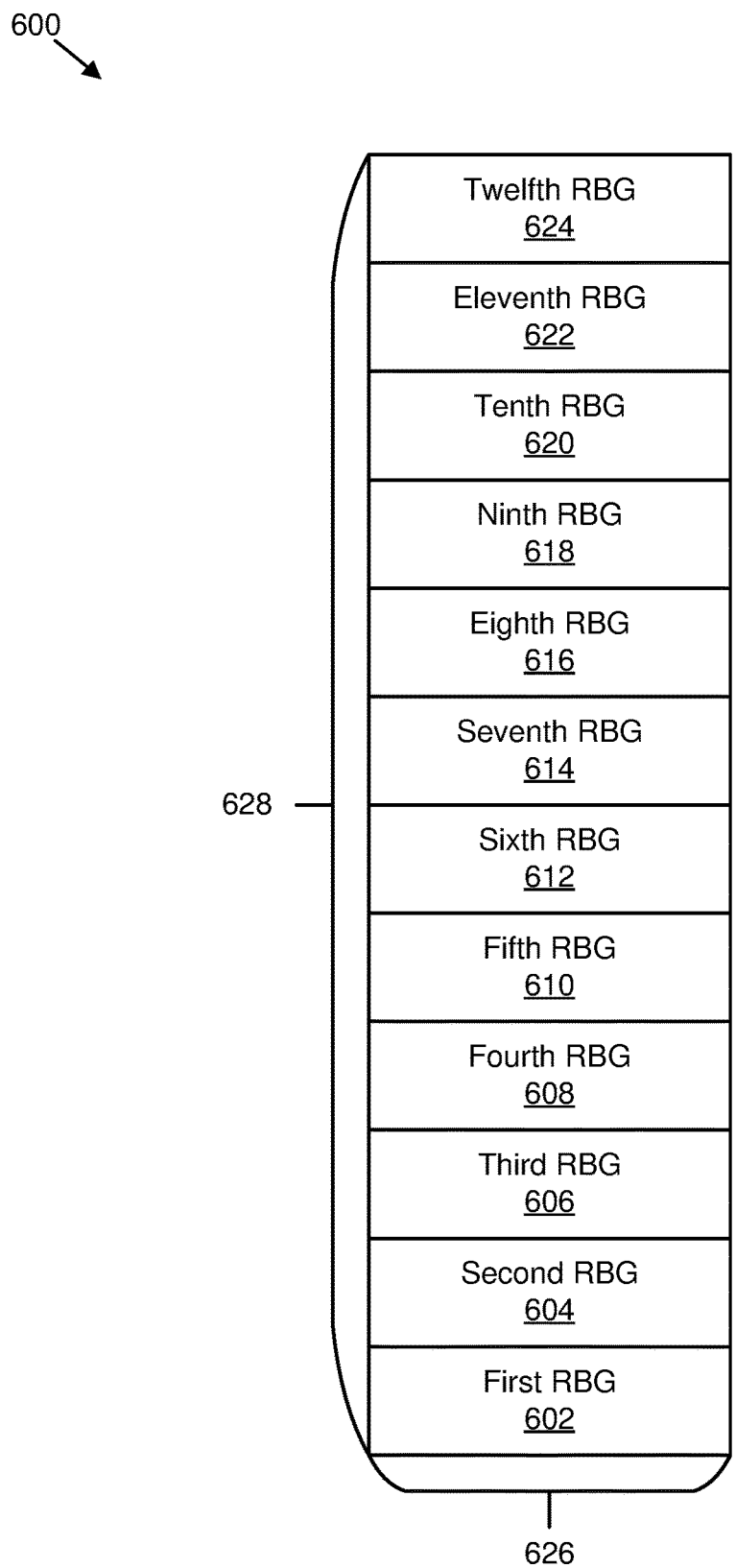
FIG. 6 is a schematic block diagram illustrating one embodiment of resource allocation.

For example, if a bitmap in a DCI used to indicate frequency allocation is set to "011011101110" with a total of 8 bits set to a value of '1', i.e., N=8, and we assume there are 12 RBGs in a BWP (e.g., as illustrated in FIG. 6) with a single TB being repeated four times for transmission at the same time, i.e. $N_{rep}=4$, then this means that each TB occupies 2 RBGs, i.e., $N/N_{rep}=2$.

FIG. 6 is a schematic block diagram illustrating one embodiment of resource allocation 600. The resource allocation 600 includes a first RBG 602, a second RBG 604, a third RBG 606, a fourth RBG 608, a fifth RBG 610, a sixth RBG 612, a seventh RBG 614, an eighth RBG 616, a ninth RBG 618, a tenth RBG 620, an eleventh RBG 622, and a twelfth RBG 624 all transmitted in one time duration 626 (e.g., a basic time unit, a symbol, a slot, a subframe, a half-frame, and/or a frame) and over a frequency range 628. The first RBG 602 corresponds to a first bit in a bitmap, the second RBG 604 corresponds to a second bit in the bitmap, the third RBG 606 corresponds to a third bit in the bitmap, the fourth RBG 608 corresponds to a fourth bit in the bitmap, the fifth RBG 610 corresponds to a fifth bit in the bitmap, the sixth RBG 612 corresponds to a sixth bit in the bitmap, the seventh RBG 614 corresponds to a seventh bit in the bitmap, the eighth RBG 616 corresponds to an eighth bit in the bitmap, the ninth RBG 618 corresponds to a ninth bit in the bitmap, the tenth RBG 620 corresponds to a tenth bit in the bitmap, the eleventh RBG 622 corresponds to an eleventh bit in the bitmap, and the twelfth RBG 624 corresponds to a twelfth bit in the bitmap. Using the bitmap example described herein (e.g., bitmap of "011011101110"), a first TB is transmitted in the second RBG 604 and the third RBG 606, a second TB is transmitted in the fifth RBG 610 and the sixth RBG 612, a third TB is transmitted in the seventh RBG 614 and the ninth RBG 618, and a fourth TB is transmitted in the tenth RBG 620 and the eleventh RBG 622. Each of the first TB, the second TB, the third TB, and the fourth TB includes the same data that may be varied based on a redundancy version.

In some embodiments, the first RBG 602 and the twelfth RBG 624 (e.g., the last RBG) may have different RB lengths than other RBGs in a BWP, therefore, the first RBG 602 and the twelfth RBG 624 may not be used to transmit TBs.

Figure 7:
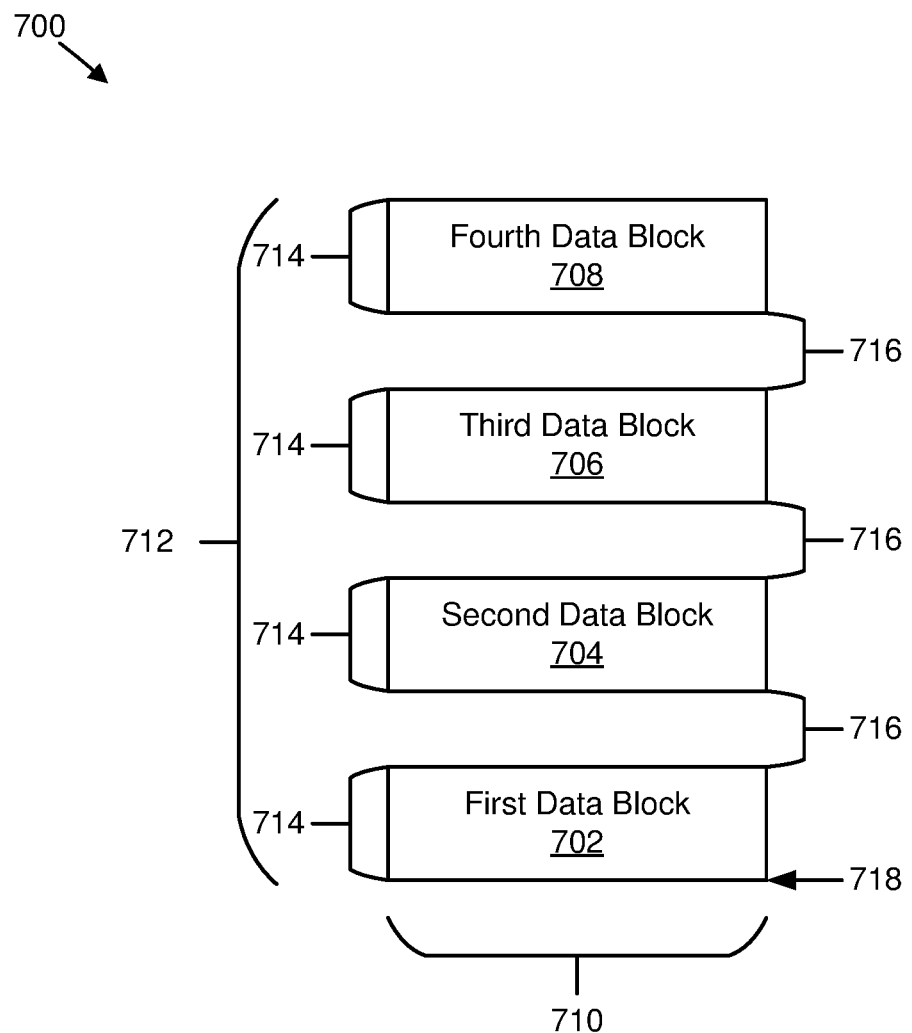
FIG. 7 is a schematic flow chart diagram illustrating another embodiment of resource allocation.

In certain embodiments, each TB occupies an equal length of continuous RBs in a frequency domain and the same time allocation in one time duration, and a number of RBs between two consecutive TBs is same as illustrated in FIG. 7. In such embodiments, a RIV may be used to indicate a start frequency of a RB and a number of RBs in the frequency domain.

FIG. 7 is a schematic flow chart diagram illustrating another embodiment of resource allocation 700. The resource allocation 700 includes a first data block 702 (e.g., first TB), a second data block 704 (e.g., second TB), a third data block 706 (e.g., third TB), and a fourth data block 708 (e.g., fourth TB) all transmitted in one time duration 710 (e.g., a basic time unit, a symbol, a slot, a subframe, a half-frame, and/or a frame) and over a frequency range 712 ("$L'_{RB}$").

Each of the first data block 702, the second data block 704, the third data block 706, and the fourth data block 708 may carry the same data that may be redundant but may vary based on a redundancy version. Furthermore, each of the first data block 702, the second data block 704, the third data block 706, and the fourth data block 708 occupies a set of virtual resource blocks 714 ("$L_{RB}$") in a frequency domain (e.g., a set of consecutive virtual resource blocks, each set of virtual resource blocks has a same number of consecutive virtual resource blocks). Moreover, a frequency offset 716 ("$Offset_{RB}$") (e.g., number of virtual resource blocks used to separate transmitted data blocks) is the same between two adjacent data blocks. As may be appreciated, the frequency range 712 equals the sum of the four sets of virtual resource blocks 714 and the three frequency offsets 716. A starting frequency 718 ("$Start_{RB}$") indicates a frequency at which the first data block 702 (e.g., the lowest frequency RB) starts.

In some embodiments, the number of the repeated TBs transmitted in the time duration 710 may be $N_{rep}$ and may be configured by high layer signaling, and the Offset$_{RB}$ may be indicated to a UE by high layer signaling or in L1 signaling (e.g., PDCCH).

In some embodiments, there may be at least two embodiments used to indicate the resource allocation 700 illustrated in FIG. 7 (e.g., via DCI). In a first embodiment, a field for frequency domain resource assignment in DCI may indicate the starting frequency 718 (e.g., Start$_{RB}$) and the set of virtual resource blocks 714 (e.g., L$_{RB}$) of the TB (e.g., the first data block 702) with the lowest RB in the frequency domain. In a second embodiment, a field for frequency domain resource assignment in DCI may indicate the starting frequency 718 and the frequency range 712 (e.g., L'$_{RB}$). In certain embodiments, there may be a relationship between L'$_{RB}$ and L$_{RB}$ which is represent as L'$_{RB}$=(N$_{rep}$−1) Offset$_{RB}$+ N$_{rep}$L$_{RB}$, the first and second embodiments described may have equal function in indicating the frequency allocation of multiple TBs.

In certain embodiments, a CSI-RS or an SSB resource may be used to indicate a DL TX beam of a gNB, and an SRS resource may be used to indicate a UL TX beam of a UE. As may be appreciated, because a beam pair (e.g., mapped TX beam to RX beam) may be obtained by beam management, a UE may know which RX beam should be used for receiving information if a CSI-RS or an SSB resource is used to indicate a TX beam. In some embodiments, an SRS resource may indicate an UL TX beam. Therefore, because there is a one to one mapping between a TX beam and an RX beam for the UE, the UL TX beam may implicitly indicate the DL RX beam. Described herein are two examples used to indicate beam information transmitted to UEs for multiple simultaneous TB transmissions over multiple TX beams from multiple TRPs and/or panels.

In one embodiment, a CSI-RS resource set or an SSB resource set, respectively, including all the CSI-RS resources or all the SSB resources that represent the TX beams, are used to transmit multiple TBs simultaneously as resource RSs of a TCI indicated in DL DCI or configured by RRC signaling to indicate the beam information.

For example, assume that a first CSI-RS resource, a second CSI-RS resource, a third CSI-RS resource, and a fourth CSI-RS resource represent the first TX beam 412, the second TX beam 414, the third TX beam 416, and the fourth TX beam 418 respectively in FIG. 4, or the first TX beam 512, the second TX beam 514, the third TX beam 518, and the fourth TX beam 520 respectively in FIG. 5, then the CSI-RS resource set includes the first CSI-RS resource, the second CSI-RS resource, the third CSI-RS resource, and the fourth CSI-RS resource and may be configured as the resource RSs of the TCI.

In another embodiment, an SRS resource set including at most one SRS resource per UE panel to indicate one or more RX beams to receive multiple TBs simultaneously transmitted using multiple TX beams. In one embodiment, there are three methods used to indicate the RX beam information using the SRS resource set. In a first method, the SRS resource set may be used as an RX beam indication in RRC signaling. Moreover, in a second method, the SRS resource set may be used as a resource RS of a TCI field in DL DCI. Furthermore, in a third method, the SRS resource set may use an SRI in DL DCI to indicate the DL RX beam.

For example, if a first SRS resource set corresponds to an RX beam in FIG. 4, e.g., a first SRS resource, then the first SRS resource set that includes the first SRS resource is used to indicate the RX beam using one method described herein. As another example, if a second SRS resource set corresponding to a first RX beam and a second RX beam in FIG. 5, e.g., a first SRS resource and a second SRS resource respectively, then the second SRS resource set that includes both the first SRS resource and the second SRS resource is used to indicate the RX beams using one method described herein.

In some embodiments, an SRS resource set used to indicate the RX beam information may be configured by high layer signaling to indicate that the usage of the SRS resource set is for DL transmission beam indication.

In one embodiment, an index n (e.g., n=0, . . . , N$_{rep}$−1) of TB repetitions is increased with an occupied RB index for all the TB repetitions in the frequency domain. In some embodiments, each TB may have a redundancy version indicated to facilitate decoding of the TB by a UE.

In certain embodiments, multiple redundancy version sequences may be configured via high layer signaling (e.g., via RRC signaling), and a redundancy version field in the DCI may be used to indicate one of the redundancy version sequences.

Figure 8:
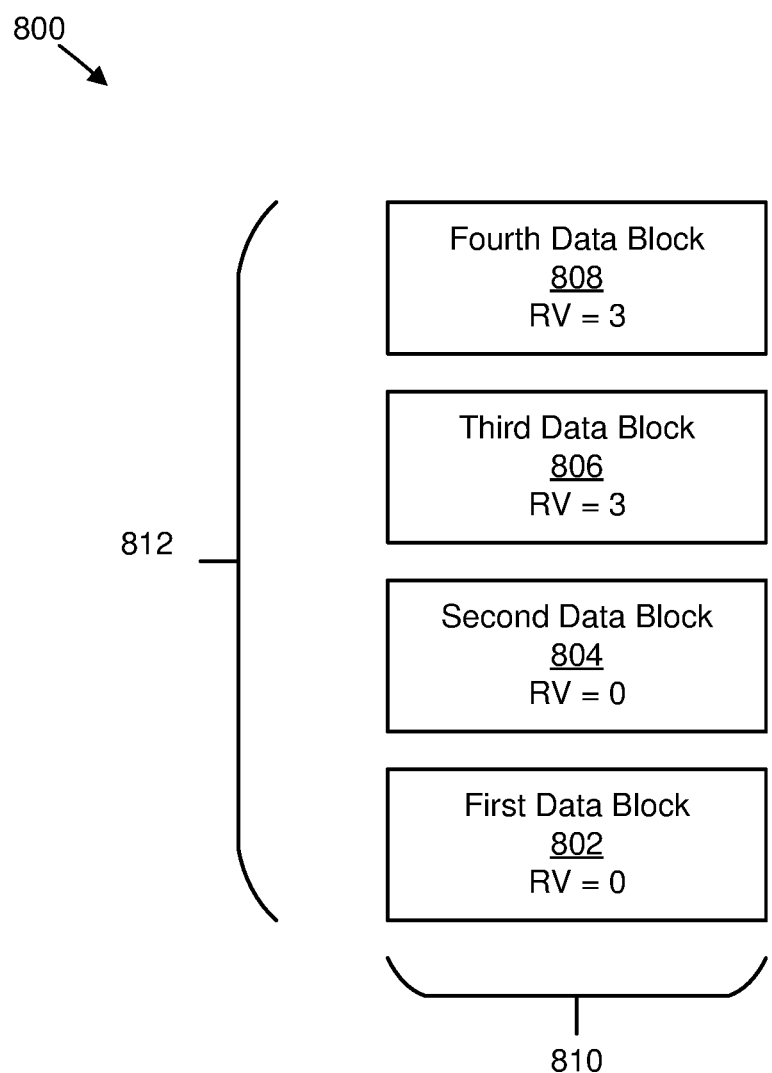
FIG. 8 is a schematic flow chart diagram illustrating a further embodiment of resource allocation.
Figure 9:
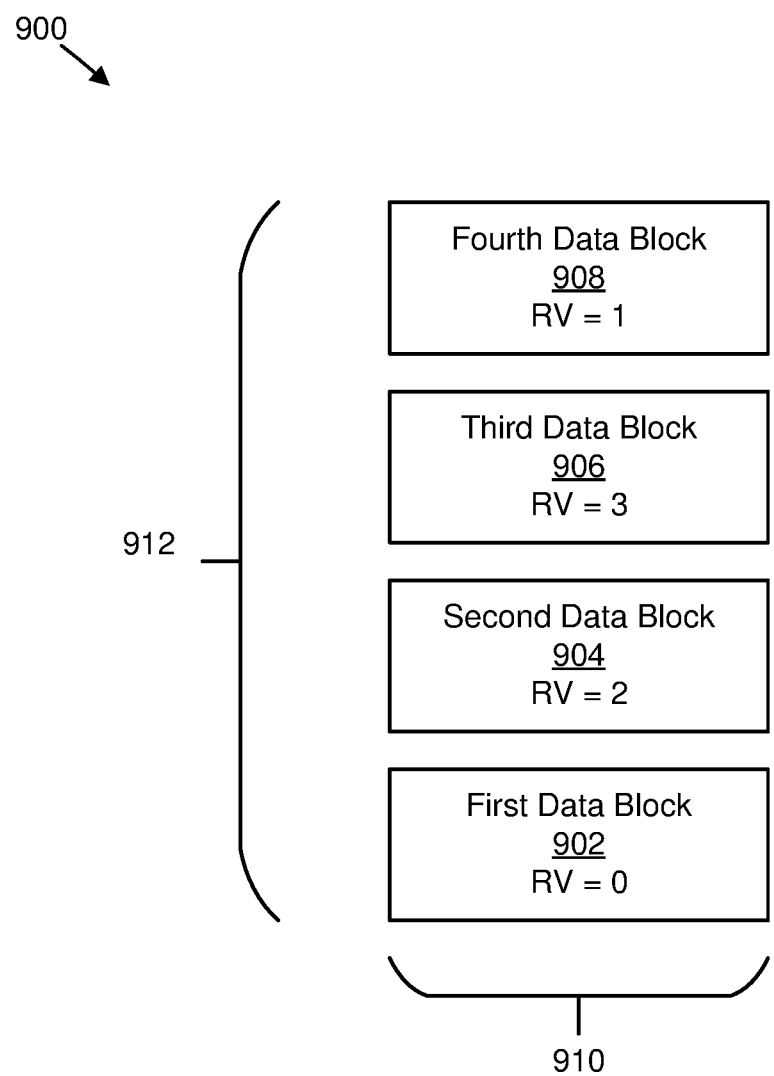
FIG. 9 is a schematic flow chart diagram illustrating yet another embodiment of resource allocation.

For example, 4 redundancy version sequences may be configured for a UE via RRC signaling in a time duration as shown in Table 1, and two bits in the redundancy version field in DCI may be used to indicate which sequence in Table 1 should be used. FIG. 8 shows the RV value of each repetition if the RV ID in the DCI field is set as '01' according to the RV sequence configuration in Table 1. In another example, 4 redundancy version sequences may be configured for a UE via RRC signaling in another time duration as shown in Table 2, and two bits in the redundancy version field in DCI may be used to indicate which sequence in Table 2 should be used. FIG. 9 shows the RV value of each repetition if the RV ID in the DCI field is set as '11' according to the RV sequence configuration in Table 2.

Specifically, FIG. 8 is a schematic flow chart diagram illustrating a further embodiment of resource allocation 800. The resource allocation 800 includes a first data block 802 (e.g., first TB), a second data block 804 (e.g., second TB), a third data block 806 (e.g., third TB), and a fourth data block 808 (e.g., fourth TB) all transmitted in one time duration 810 (e.g., a basic time unit, a symbol, a slot, a subframe, a half-frame, and/or a frame) and over a frequency range 812. The first data block 802 has an RV=0, the second data block 804 has an RV=0, the third data block 806 has an RV=3, and the fourth data block 808 has an RV=3.

FIG. 9 is a schematic flow chart diagram illustrating yet another embodiment of resource allocation 900. The resource allocation 900 includes a first data block 902 (e.g., first TB), a second data block 904 (e.g., second TB), a third data block 906 (e.g., third TB), and a fourth data block 908 (e.g., fourth TB) all transmitted in one time duration 910 (e.g., a basic time unit, a symbol, a slot, a subframe, a half-frame, and/or a frame) and over a frequency range 912. The first data block 902 has an RV-0, the second data block 904 has an RV=2, the third data block 906 has an RV=3, and the fourth data block 908 has an RV=1.

TABLE 1

| | Redundancy Version Sequences | | | |
|---|---|---|---|---|
| RV ID in DCI field | n mod 4 = 0 | n mod 4 = 1 | n mod 4 = 2 | n mod 4 = 3 |
| 00 | 0 | 0 | 0 | 0 |
| 01 | 0 | 0 | 3 | 3 |
| 10 | 3 | 2 | 0 | 1 |
| 11 | 0 | 2 | 3 | 1 |

TABLE 2

| RV ID in DCI field | Redundancy Version Sequences | | | |
| --- | --- | --- | --- | --- |
| | n mod 4 = 0 | n mod 4 = 1 | n mod 4 = 2 | n mod 4 = 3 |
| 00 | 0 | 0 | 0 | 0 |
| 01 | 0 | 3 | 0 | 3 |
| 10 | 2 | 0 | 2 | 0 |
| 11 | 0 | 2 | 3 | 1 |

Figure 10:
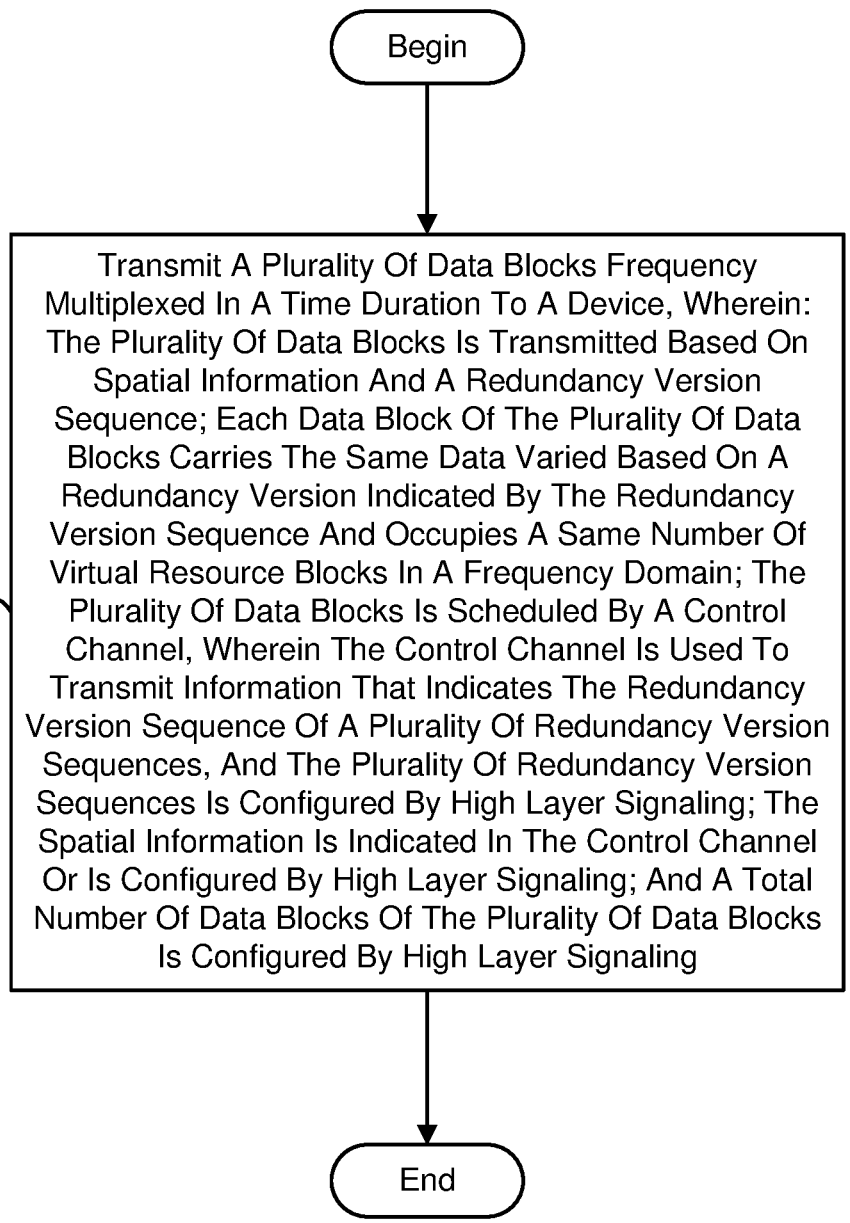
FIG. 10 is a schematic flow chart diagram illustrating one embodiment of a method for data block transmissions.

FIG. 10 is a schematic flow chart diagram illustrating one embodiment of a method 1000 for data block transmissions. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002 a plurality of data blocks frequency multiplexed in a time duration to a device, wherein: the plurality of data blocks is transmitted based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

In certain embodiments, the spatial information comprises a resource set selected from a group comprising: a channel state information reference signal resource set and a synchronization signal block resource set. In some embodiments, channel state information reference signal resources of the channel state information reference signal resource set are transmittable simultaneously. In various embodiments, synchronization signal block resources of the synchronization signal block resource set are transmittable simultaneously.

In one embodiment, the spatial information comprises a sounding reference signal resource set. In certain embodiments, sounding reference signal resources of the sounding reference signal resource set are transmittable simultaneously, and each sounding reference signal resource of the sounding reference signal resource set is mapped to a corresponding downlink device receive beam. In some embodiments, the time duration comprises a single time duration selected from a group comprising: a basic time unit, a symbol, a slot, a subframe, a half-frame, and a frame.

In various embodiments, a bitmap is transmitted in the control channel, and each bit of the bitmap corresponds to a resource block group of a plurality of resource block groups with a bit having a value of '1' indicating that a corresponding resource block group is occupied. In one embodiment, the resource block group comprises a set of consecutive virtual resource blocks. In certain embodiments, each data block of the plurality of data blocks occupies a same number of resource block groups indicated by the bitmap as being occupied.

In some embodiments, each data block of the plurality of data blocks occupies the resource block groups indicated by the bitmap as being occupied in ascending order. In various embodiments, each data block of the plurality of data blocks is transmitted based on consecutive virtual resource blocks. In one embodiment, a separation number of virtual resource blocks between two consecutive data blocks of the plurality of data blocks is the same for each two consecutive data blocks of the plurality of data blocks.

In certain embodiments, the separation number of virtual resource blocks between the two consecutive data blocks is configured by high layer signaling. In some embodiments, the separation number of virtual resource blocks between the two consecutive data blocks is indicated in the control channel. In various embodiments, a starting frequency and a number of virtual resource blocks of a first data block having a lowest virtual resource block index value of the plurality of data blocks is indicated in the control channel.

In one embodiment, a starting frequency of a first data block having a lowest virtual resource block index value of the plurality of data blocks and a total number of virtual resource blocks are indicated in the control channel, and the total number of virtual resource blocks comprises a sum of a number of virtual resource blocks of each data block of the plurality of data blocks and the separation number of virtual resource blocks between each two consecutive data blocks of the plurality of data blocks.

Figure 11:
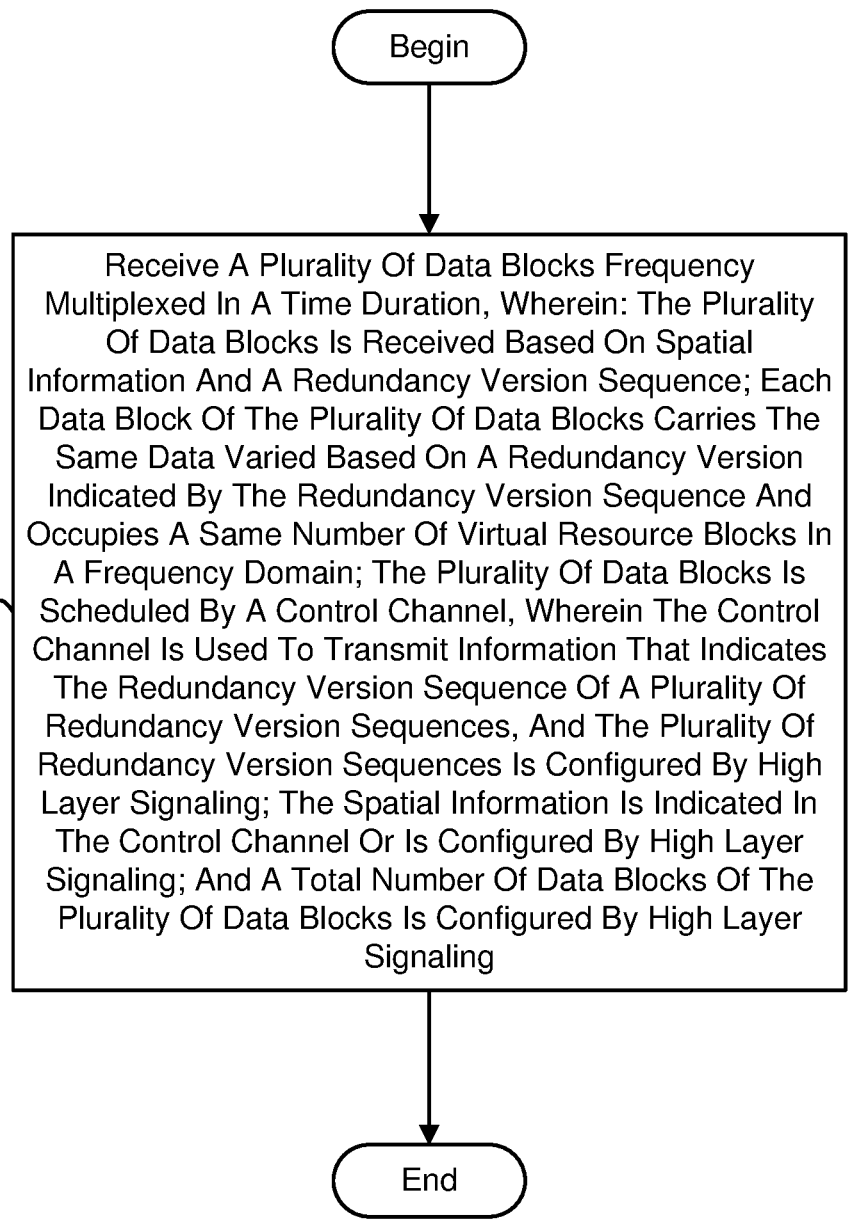
FIG. 11 is a schematic flow chart diagram illustrating another embodiment of a method for data block transmissions.

FIG. 11 is a schematic flow chart diagram illustrating another embodiment of a method 1100 for data block transmissions. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102 a plurality of data blocks frequency multiplexed in a time duration, wherein: the plurality of data blocks is received based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

In certain embodiments, the spatial information comprises a resource set selected from a group comprising: a channel state information reference signal resource set and a synchronization signal block resource set. In some embodiments, channel state information reference signal resources of the channel state information reference signal resource set are receivable simultaneously. In various embodiments, synchronization signal block resources of the synchronization signal block resource set are receivable simultaneously.

In one embodiment, the spatial information comprises a sounding reference signal resource set. In certain embodiments, sounding reference signal resources of the sounding reference signal resource set are receivable simultaneously, and each sounding reference signal resource of the sounding reference signal resource set is mapped to a corresponding downlink device receive beam. In some embodiments, the time duration comprises a single time duration selected from a group comprising: a basic time unit, a symbol, a slot, a subframe, a half-frame, and a frame.

In various embodiments, a bitmap is transmitted in the control channel, and each bit of the bitmap corresponds to a resource block group of a plurality of resource block groups with a bit having a value of '1' indicating that a corresponding resource block group is occupied. In one embodiment, the resource block group comprises a set of consecutive virtual resource blocks. In certain embodiments, each data block of the plurality of data blocks occupies a same number of resource block groups indicated by the bitmap as being occupied.

In some embodiments, each data block of the plurality of data blocks occupies the resource block groups indicated by the bitmap as being occupied in ascending order. In various embodiments, each data block of the plurality of data blocks is receivable based on consecutive virtual resource blocks. In one embodiment, a separation number of virtual resource blocks between two consecutive data blocks of the plurality of data blocks is the same for each two consecutive data blocks of the plurality of data blocks.

In certain embodiments, the separation number of virtual resource blocks between the two consecutive data blocks is configured by high layer signaling. In some embodiments, the separation number of virtual resource blocks between the two consecutive data blocks is indicated in the control channel. In various embodiments, a starting frequency and a frequency number of virtual resource blocks of a first data block having a lowest virtual resource block index value of the plurality of data blocks is indicated in the control channel.

In one embodiment, a starting frequency of a first data block having a lowest virtual resource block index value of the plurality of data blocks and a total number of virtual resource blocks are indicated in the control channel, and the total number of virtual resource blocks comprises a sum of a number of virtual resource blocks of each data block of the plurality of data blocks and the separation number of virtual resource blocks between each two consecutive data blocks of the plurality of data blocks.

In one embodiment, a method comprises: transmitting a plurality of data blocks frequency multiplexed in a time duration to a device, wherein: the plurality of data blocks is transmitted based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

In certain embodiments, the spatial information comprises a resource set selected from a group comprising: a channel state information reference signal resource set and a synchronization signal block resource set.

In some embodiments, channel state information reference signal resources of the channel state information reference signal resource set are transmittable simultaneously.

In various embodiments, synchronization signal block resources of the synchronization signal block resource set are transmittable simultaneously.

In one embodiment, the spatial information comprises a sounding reference signal resource set.

In certain embodiments, sounding reference signal resources of the sounding reference signal resource set are transmittable simultaneously, and each sounding reference signal resource of the sounding reference signal resource set is mapped to a corresponding downlink device receive beam.

In some embodiments, the time duration comprises a single time duration selected from a group comprising: a basic time unit, a symbol, a slot, a subframe, a half-frame, and a frame.

In various embodiments, a bitmap is transmitted in the control channel, and each bit of the bitmap corresponds to a resource block group of a plurality of resource block groups with a bit having a value of '1' indicating that a corresponding resource block group is occupied.

In one embodiment, the resource block group comprises a set of consecutive virtual resource blocks.

In certain embodiments, each data block of the plurality of data blocks occupies a same number of resource block groups indicated by the bitmap as being occupied.

In some embodiments, each data block of the plurality of data blocks occupies the resource block groups indicated by the bitmap as being occupied in ascending order.

In various embodiments, each data block of the plurality of data blocks is transmitted based on consecutive virtual resource blocks.

In one embodiment, a separation number of virtual resource blocks between two consecutive data blocks of the plurality of data blocks is the same for each two consecutive data blocks of the plurality of data blocks.

In certain embodiments, the separation number of virtual resource blocks between the two consecutive data blocks is configured by high layer signaling.

In some embodiments, the separation number of virtual resource blocks between the two consecutive data blocks is indicated in the control channel.

In various embodiments, a starting frequency and a number of virtual resource blocks of a first data block having a lowest virtual resource block index value of the plurality of data blocks is indicated in the control channel.

In one embodiment, a starting frequency of a first data block having a lowest virtual resource block index value of the plurality of data blocks and a total number of virtual resource blocks are indicated in the control channel, and the total number of virtual resource blocks comprises a sum of a number of virtual resource blocks of each data block of the plurality of data blocks and the separation number of virtual resource blocks between each two consecutive data blocks of the plurality of data blocks.

In one embodiment, an apparatus comprises: a transmitter that transmits a plurality of data blocks frequency multiplexed in a time duration to a device, wherein: the plurality of data blocks is transmitted based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

In certain embodiments, the spatial information comprises a resource set selected from a group comprising: a channel state information reference signal resource set and a synchronization signal block resource set.

In some embodiments, channel state information reference signal resources of the channel state information reference signal resource set are transmittable simultaneously.

In various embodiments, synchronization signal block resources of the synchronization signal block resource set are transmittable simultaneously.

In one embodiment, the spatial information comprises a sounding reference signal resource set.

In certain embodiments, sounding reference signal resources of the sounding reference signal resource set are transmittable simultaneously, and each sounding reference signal resource of the sounding reference signal resource set is mapped to a corresponding downlink device receive beam.

In some embodiments, the time duration comprises a single time duration selected from a group comprising: a basic time unit, a symbol, a slot, a subframe, a half-frame, and a frame.

In various embodiments, a bitmap is transmitted in the control channel, and each bit of the bitmap corresponds to a resource block group of a plurality of resource block groups with a bit having a value of '1' indicating that a corresponding resource block group is occupied.

In one embodiment, the resource block group comprises a set of consecutive virtual resource blocks.

In certain embodiments, each data block of the plurality of data blocks occupies a same number of resource block groups indicated by the bitmap as being occupied.

In some embodiments, each data block of the plurality of data blocks occupies the resource block groups indicated by the bitmap as being occupied in ascending order.

In various embodiments, each data block of the plurality of data blocks is transmitted based on consecutive virtual resource blocks.

In one embodiment, a separation number of virtual resource blocks between two consecutive data blocks of the plurality of data blocks is the same for each two consecutive data blocks of the plurality of data blocks.

In certain embodiments, the separation number of virtual resource blocks between the two consecutive data blocks is configured by high layer signaling.

In some embodiments, the separation number of virtual resource blocks between the two consecutive data blocks is indicated in the control channel.

In various embodiments, a starting frequency and a number of virtual resource blocks of a first data block having a lowest virtual resource block index value of the plurality of data blocks is indicated in the control channel.

In one embodiment, a starting frequency of a first data block having a lowest virtual resource block index value of the plurality of data blocks and a total number of virtual resource blocks are indicated in the control channel, and the total number of virtual resource blocks comprises a sum of a number of virtual resource blocks of each data block of the plurality of data blocks and the separation number of virtual resource blocks between each two consecutive data blocks of the plurality of data blocks.

In one embodiment, a method comprises: receiving a plurality of data blocks frequency multiplexed in a time duration, wherein: the plurality of data blocks is received based on spatial information and a redundancy version sequence; each data block of the plurality of data blocks carries the same data varied based on a redundancy version indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

In certain embodiments, the spatial information comprises a resource set selected from a group comprising: a channel state information reference signal resource set and a synchronization signal block resource set.

In some embodiments, channel state information reference signal resources of the channel state information reference signal resource set are receivable simultaneously.

In various embodiments, synchronization signal block resources of the synchronization signal block resource set are receivable simultaneously.

In one embodiment, the spatial information comprises a sounding reference signal resource set.

In certain embodiments, sounding reference signal resources of the sounding reference signal resource set are receivable simultaneously, and each sounding reference signal resource of the sounding reference signal resource set is mapped to a corresponding downlink device receive beam.

In some embodiments, the time duration comprises a single time duration selected from a group comprising: a basic time unit, a symbol, a slot, a subframe, a half-frame, and a frame.

In various embodiments, a bitmap is transmitted in the control channel, and each bit of the bitmap corresponds to a resource block group of a plurality of resource block groups with a bit having a value of '1' indicating that a corresponding resource block group is occupied.

In one embodiment, the resource block group comprises a set of consecutive virtual resource blocks.

In certain embodiments, each data block of the plurality of data blocks occupies a same number of resource block groups indicated by the bitmap as being occupied.

In some embodiments, each data block of the plurality of data blocks occupies the resource block groups indicated by the bitmap as being occupied in ascending order.

In various embodiments, each data block of the plurality of data blocks is receivable based on consecutive virtual resource blocks.

In one embodiment, a separation number of virtual resource blocks between two consecutive data blocks of the plurality of data blocks is the same for each two consecutive data blocks of the plurality of data blocks.

In certain embodiments, the separation number of virtual resource blocks between the two consecutive data blocks is configured by high layer signaling.

In some embodiments, the separation number of virtual resource blocks between the two consecutive data blocks is indicated in the control channel.

In various embodiments, a starting frequency and a number of virtual resource blocks of a first data block having a lowest virtual resource block index value of the plurality of data blocks is indicated in the control channel.

In one embodiment, a starting frequency of a first data block having a lowest virtual resource block index value of the plurality of data blocks and a total number of virtual resource blocks are indicated in the control channel, and the total number of virtual resource blocks comprises a sum of a number of virtual resource blocks of each data block of the plurality of data blocks and the separation number of virtual resource blocks between each two consecutive data blocks of the plurality of data blocks.

In one embodiment, an apparatus comprises: a receiver that receives a plurality of data blocks frequency multiplexed in a time duration, wherein: the plurality of data blocks is received based on spatial information and a redundancy version sequence; each data block of the plurality of data blocks carries the same data varied based on a redundancy indicated by the redundancy version sequence and occupies a same number of virtual resource blocks in a frequency domain; the plurality of data blocks is scheduled by a control channel, wherein the control channel is used to transmit information that indicates the redundancy version sequence of a plurality of redundancy version sequences, and the plurality of redundancy version sequences is configured by high layer signaling; the spatial information is indicated in the control channel or is configured by high layer signaling; and a total number of data blocks of the plurality of data blocks is configured by high layer signaling.

In certain embodiments, the spatial information comprises a resource set selected from a group comprising: a channel state information reference signal resource set and a synchronization signal block resource set.

In some embodiments, channel state information reference signal resources of the channel state information reference signal resource set are receivable simultaneously.

In various embodiments, synchronization signal block resources of the synchronization signal block resource set are receivable simultaneously.

In one embodiment, the spatial information comprises a sounding reference signal resource set.

In certain embodiments, sounding reference signal resources of the sounding reference signal resource set are receivable simultaneously, and each sounding reference signal resource of the sounding reference signal resource set is mapped to a corresponding downlink device receive beam.

In some embodiments, the time duration comprises a single time duration selected from a group comprising: a basic time unit, a symbol, a slot, a subframe, a half-frame, and a frame.

In various embodiments, a bitmap is transmitted in the control channel, and each bit of the bitmap corresponds to a resource block group of a plurality of resource block groups with a bit having a value of '1' indicating that a corresponding resource block group is occupied.

In one embodiment, the resource block group comprises a set of consecutive virtual resource blocks.

In certain embodiments, each data block of the plurality of data blocks occupies a same number of resource block groups indicated by the bitmap as being occupied.

In some embodiments, each data block of the plurality of data blocks occupies the resource block groups indicated by the bitmap as being occupied in ascending order.

In various embodiments, each data block of the plurality of data blocks is receivable based on consecutive virtual resource blocks.

In one embodiment, a separation number of virtual resource blocks between two consecutive data blocks of the plurality of data blocks is the same for each two consecutive data blocks of the plurality of data blocks.

In certain embodiments, the separation number of virtual resource blocks between the two consecutive data blocks is configured by high layer signaling.

In some embodiments, the separation number of virtual resource blocks between the two consecutive data blocks is indicated in the control channel.

In various embodiments, a starting frequency and a number of virtual resource blocks of a first data block having a lowest virtual resource block index value of the plurality of data blocks is indicated in the control channel.

In one embodiment, a starting frequency of a first data block having a lowest virtual resource block index value of the plurality of data blocks and a total number of virtual resource blocks are indicated in the control channel, and the total number of virtual resource blocks comprises a sum of a number of virtual resource blocks of each data block of the plurality of data blocks and the separation number of virtual resource blocks between each two consecutive data blocks of the plurality of data blocks.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
   transmitting a plurality of data blocks frequency multiplexed in a time duration to a device, wherein:
      the plurality of data blocks is transmitted based on spatial information and a redundancy version sequence;
      each data block of the plurality of data blocks carries the same data varied based on a redundancy version indicated by the redundancy version sequence;
      the plurality of data blocks is scheduled by a control channel, wherein the control channel is used to transmit information that indicates the redundancy version sequence of a plurality of redundancy version sequences; and
      the spatial information is indicated in the control channel or is configured by high layer signaling, and the spatial information comprises multiple channel state information resource signal (CSI-RS) resources, multiple synchronization signal block (SSB) resources, or multiple sounding reference signal (SRS) resources.

2. The method of claim 1, wherein channel state information reference signal resources of the channel state information reference signal resource set are transmittable simultaneously.

3. The method of claim 1, wherein a bitmap is transmitted in the control channel, and each bit of the bitmap corresponds to a resource block group of a plurality of resource block groups with a bit having a value of '1' indicating that a corresponding resource block group is occupied.

4. The method of claim 3, wherein the resource block group comprises a set of consecutive virtual resource blocks.

5. The method of claim 1, wherein each data block of the plurality of data blocks is transmitted based on consecutive virtual resource blocks.

6. A method performed by a user equipment (UE), the method comprising:
receiving a plurality of data blocks frequency multiplexed in a time duration, wherein:
the plurality of data blocks is received based on spatial information and a redundancy version sequence;
each data block of the plurality of data blocks carries the same data varied based on a redundancy version indicated by the redundancy version sequence;
the plurality of data blocks is scheduled by a control channel, wherein the control channel is used to transmit information that indicates the redundancy version sequence of a plurality of redundancy version sequences; and
the spatial information is indicated in the control channel or is configured by high layer signaling, and the spatial information comprises multiple channel state information resource signal (CSI-RS) resources, multiple synchronization signal block (SSB) resources, or multiple sounding reference signal (SRS) resources.

7. The method of claim 6, wherein channel state information reference signal resources of the channel state information reference signal resource set are receivable simultaneously.

8. The method of claim 6, wherein a bitmap is transmitted in the control channel, and each bit of the bitmap corresponds to a resource block group of a plurality of resource block groups with a bit having a value of '1' indicating that a corresponding resource block group is occupied.

9. The method of claim 8, wherein the resource block group comprises a set of consecutive virtual resource blocks.

10. The method of claim 6, wherein each data block of the plurality of data blocks is receivable based on consecutive virtual resource blocks.

11. A user equipment (UE), comprising:
at least one memory; and
at least one processor coupled with the at least one memory and configured to cause the UE to:
receive a plurality of data blocks frequency multiplexed in a time duration, wherein:
the plurality of data blocks is received based on spatial information and a redundancy version sequence;
each data block of the plurality of data blocks carries the same data varied based on a redundancy version indicated by the redundancy version sequence;
the plurality of data blocks is scheduled by a control channel, wherein the control channel is used to transmit information that indicates the redundancy version sequence of a plurality of redundancy version sequences; and
the spatial information is indicated in the control channel or is configured by high layer signaling, and the spatial information comprises multiple channel state information resource signal (CSI-RS) resources, multiple synchronization signal block (SSB) resources, or multiple sounding reference signal (SRS) resources.

12. The UE of claim 11, wherein channel state information reference signal resources of the channel state information reference signal resource set are receivable simultaneously.

13. The UE of claim 11, wherein synchronization signal block resources of the synchronization signal block resource set are receivable simultaneously.

14. The UE of claim 11, wherein the time duration comprises a single time duration selected from a group comprising: a basic time unit, a symbol, a slot, a subframe, a half-frame, and a frame.

15. The UE of claim 11, wherein a bitmap is transmitted in the control channel, and each bit of the bitmap corresponds to a resource block group of a plurality of resource block groups with a bit having a value of '1' indicating that a corresponding resource block group is occupied.

16. The UE of claim 15, wherein the resource block group comprises a set of consecutive virtual resource blocks.

17. The UE of claim 11, wherein each data block of the plurality of data blocks is receivable based on consecutive virtual resource blocks.

18. A base station, comprising:
at least one memory; and
at least one processor coupled with the at least one memory and configured to cause the base station to:
transmit a plurality of data blocks frequency multiplexed in a time duration to a device, wherein:
the plurality of data blocks is transmitted based on spatial information and a redundancy version sequence;
each data block of the plurality of data blocks carries the same data varied based on a redundancy version indicated by the redundancy version sequence;
the plurality of data blocks is scheduled by a control channel, wherein the control channel is used to transmit information that indicates the redundancy version sequence of a plurality of redundancy version sequences; and
the spatial information is indicated in the control channel or is configured by high layer signaling, and the spatial information comprises multiple channel state information resource signal (CSI-RS) resources, multiple synchronization signal block (SSB) resources, or multiple sounding reference signal (SRS) resources.

* * * * *